(12) United States Patent
Khosravani

(10) Patent No.: US 10,978,213 B2
(45) Date of Patent: Apr. 13, 2021

(54) INSULATIVE CELL BODY WITH INTERNAL ELECTRODE FOR RADIATION SHIELDING

(71) Applicant: The Boeing Company, Chicago, IL (US)

(72) Inventor: Shahriar Khosravani, Mukilteo, WA (US)

(73) Assignee: THE BOEING COMPANY, Chicago, IL (US)

(*) Notice: Subject to any disclaimer, the term of this patent is extended or adjusted under 35 U.S.C. 154(b) by 134 days.

(21) Appl. No.: 16/109,292

(22) Filed: Aug. 22, 2018

(65) Prior Publication Data
US 2020/0066417 A1    Feb. 27, 2020

(51) Int. Cl.
*G21F 3/00* (2006.01)
*B64G 1/54* (2006.01)

(52) U.S. Cl.
CPC . *G21F 3/00* (2013.01); *B64G 1/54* (2013.01)

(58) Field of Classification Search
CPC .................................. G21F 3/00; B64G 1/54
See application file for complete search history.

(56) References Cited

U.S. PATENT DOCUMENTS

| | | | | |
|---|---|---|---|---|
| 4,132,570 A | * | 1/1979 | Caruso | H02S 40/34 136/244 |
| 4,639,642 A | * | 1/1987 | Roberts | H01J 25/00 315/39 |
| 6,121,569 A | * | 9/2000 | Miley | F03H 1/00 219/121.48 |
| 2002/0024808 A1 | * | 2/2002 | Suehiro | H01L 33/60 362/245 |
| 2006/0185716 A1 | * | 8/2006 | Murozono | H01L 31/035281 136/250 |
| 2015/0000725 A1 | * | 1/2015 | Reilly | H02S 20/20 136/251 |

* cited by examiner

*Primary Examiner* — Brooke Purinton
(74) *Attorney, Agent, or Firm* — Alston & Bird LLP

(57) ABSTRACT

A protective layer, a cell and a method provide radiation shielding. The cell and the protective layer formed of a plurality of cells provide radiation shielding, such as from protons and alpha particles having dangerously high energy levels, while being more lightweight than a conventional bulk HDPE protective layer. In the context of a protective layer, the protective layer includes a plurality of cells positioned proximate one another. The plurality of cells include at least a first cell. The first cell includes a cell body formed of an insulative material and extends between opposed first and second ends. The first cell also includes a conductive spherical portion proximate the first end of the cell body and an electrode disposed interior of the conductive spherical portion.

19 Claims, 4 Drawing Sheets

INSULATIVE CELL BODY WITH INTERNAL ELECTRODE FOR RADIATION SHIELDING

TECHNOLOGICAL FIELD

A protective layer and method are disclosed for providing radiation shielding and, more particularly, a protective layer and associated method are provided that include a plurality of cells constructed so as to provide radiation shielding.

BACKGROUND

The Earth is surrounded by a geomagnetic shielding region that protects the Earth and its inhabitants from harmful protons and alpha particles, such as protons and alpha particles having relatively high levels of energy, such as ten kilo electronvolts (keV) or more. Beyond the protective geomagnetic shielding region provided by the Earth, such as during space travel or habitation in space or upon other planets, there is generally no similar geomagnetic shielding region or at least no geomagnetic shielding region that offers comparable protection from protons and alpha particles. Absent protection, therefore, people engaged in space travel or habitation in space or upon other planets will be exposed to protons and alpha particles that have higher levels of energy.

In order to protect people outside of the Earth's geomagnetic shielding region, structures that people will inhabit, such as spacecraft or other habitable structures, have been designed to include a significant protective layer so as to reduce the exposure of its occupants to potentially harmful protons and alpha particles incident thereupon. The protective layer may be formed of bulk high density polyethylene (HDPE) and may be relatively thick so as to provide the requisite protection. In this regard, habitable structures having a protective layer formed of bulk HDPE having a thickness of about 4 centimeters have been designed in order to reduce the typical radiation level experienced by an inhabitant to lower levels, such as from 1.1 millisieverts (mSev) in the absence of the protective layer to 0.86 mSev per day.

However, a protective layer formed of HDPE and having a thickness of about 4 centimeters requires a substantial quantity of HDPE and is relatively heavy for most structures sized to comfortably house one or more occupants for any extended period of time in space or on another planet. Thus, a protective layer of HDPE increases the cost of the habitable structure as a result of the quantity of HDPE that is required. Even more significantly, the costs associated with the launch of the habitable structure having the HDPE protective layer into space are also increased as result of the added weight of the habitable structure attributable to the protective layer. In this regard, the costs associated with the launch of a habitable structure depends significantly upon the weight of the habitable structure such that the increased launch costs may be substantial.

BRIEF SUMMARY

A protective layer, a cell and a method for providing radiation shielding are provided in accordance with example embodiments to the present disclosure. The cell and the protective layer comprised of a plurality of cells provide radiation shielding, such as from protons and alpha particles having dangerously high energy levels, while being more lightweight than a conventional bulk HDPE protective layer. By being lighter, a habitable structure that includes a protective layer formed of a plurality of cells may correspondingly be lighter than a conventional habitable structure including a bulk HDPE protective layer. Consequently, the material costs and the launch costs associated with the habitable structure may be reduced without compromising the resulting radiation shielding provided by the protective layer and the associated method of the present disclosure.

In an example embodiment, a protective layer is disclosed for providing radiation shielding. The protective layer includes a plurality of cells positioned proximate one another. The plurality of cells include at least a first cell. The first cell includes a cell body formed of an insulative material and extends between opposed first and second ends. The first cell also includes a conductive spherical portion proximate the first end of the cell body and an electrode disposed interior of the conductive spherical portion.

The first end of the cell body of an example embodiment defines a recessed portion. In this example embodiment, the conductive spherical portion includes a coating of a conductive material upon the recessed portion of the first end of the cell body. The plurality of cells of an example embodiment include an array of hexagonally shaped cells positioned proximate one another. The plurality of cells of an example embodiment are positioned in contact with one another without gaps therebetween. The plurality of cells of an example embodiment are configured to be supported by a substructure. The first cell of an example embodiment further includes a conductive element extending from the conductive spherical portion through the cell body to a ground potential. The first cell of an example embodiment also includes one or more conductors extending at least partially across the conductive spherical portion and electrically connected to the electrode. In this example embodiment, a respective conductor of the one or more conductors extends in an electrically continuous manner at least partially across two or more of the plurality of cells.

In another embodiment, a cell is disclosed for providing radiation shielding. The cell includes a cell body formed of an insulative material and extends between opposed first and second ends. The cell also includes a conductive spherical portion proximate the first end of the cell body. The cell further includes an electrode disposed interior of the conductive spherical portion.

The first end of the cell body of an example embodiment defines a recessed portion. In this example embodiment, the conductive spherical portion includes a coating of a conductive material upon the recessed portion of the first end of the cell body. In an example embodiment, the cell also includes one or more conductors extending at least partially across the conductive spherical portion that are electronically connected to the electrode. In this example embodiment, the one or more conductors include an insulated jacket. The conductive spherical portion of an example embodiment has a hemispherical shape. The cell body of an example embodiment has a hexagonal shape. In this example embodiment, an inradius of the hexagonally shaped cell body is greater than a radius of the conductive spherical portion by no more than 5% of the inradius of the hexagonally shaped cell body.

In a further example embodiment, a method is disclosed for providing radiation shielding with a protective layer formed of a plurality of cells positioned proximate one another. The method includes grounding a conductive spherical portion that is proximate one end of a cell body of first cell of the plurality of cells. The cell body is formed of an insulative material. The method also includes applying a negative voltage to an electrode disposed interior of the conductive spherical portion. The method further includes deflecting protons or alpha particles that impinge upon the protective layer with the negative voltage.

In relation to applying a negative voltage to the electrode, the method of an example embodiment electrically connects the electrode to a source of negative voltage with one or more conductors extending at least partially across the conductive spherical portion. In this example embodiment, electrically connecting the electrode to the source of the negative voltage includes electrically connecting the electrode of the first cell with an electrode disposed interior of a conductive spherical portion of another of the plurality of cells, proximate the first cell. In relation to deflecting protons or alpha particles that impinge upon the protective layer, the method of an example embodiment alters the path of the protons or alpha particles such that, following deflection, the protons or alpha particles travel through the cell body of two or more of the plurality of cells. In this example embodiment, the protective layer defines opposed first and second surfaces aligned with opposed first and second ends, respectably, of the plurality of cells. As such, the method of this example embodiment alters the path of the protons or alpha particles by altering the path of the protons or alpha particles that enter the protective layer at an obtuse angle relative to the first surface such that the protons or alpha particles exit the protective layer at an acute angle relative to the second surface.

BRIEF DESCRIPTION OF THE DRAWINGS

Figure 1A:
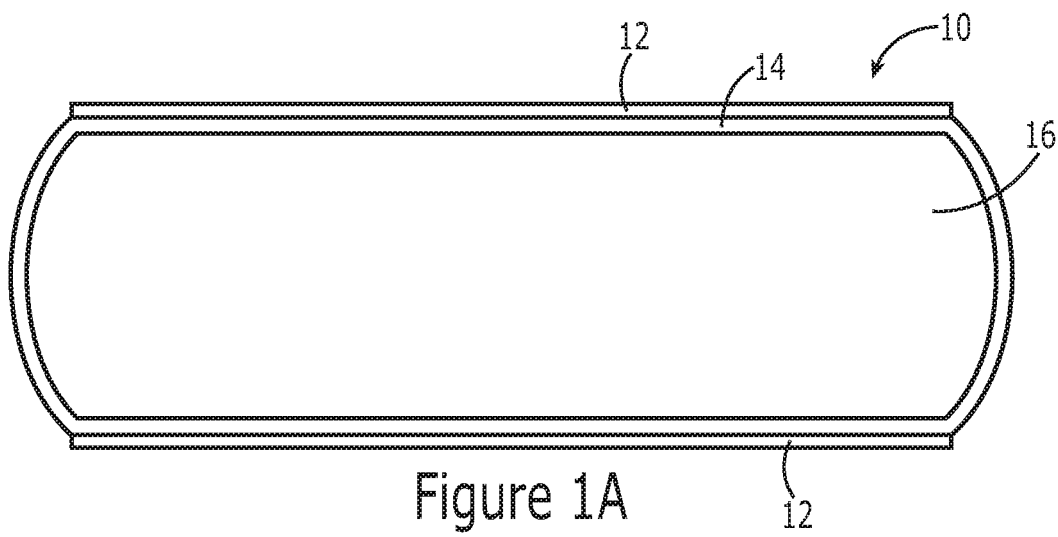
Figure 1B:
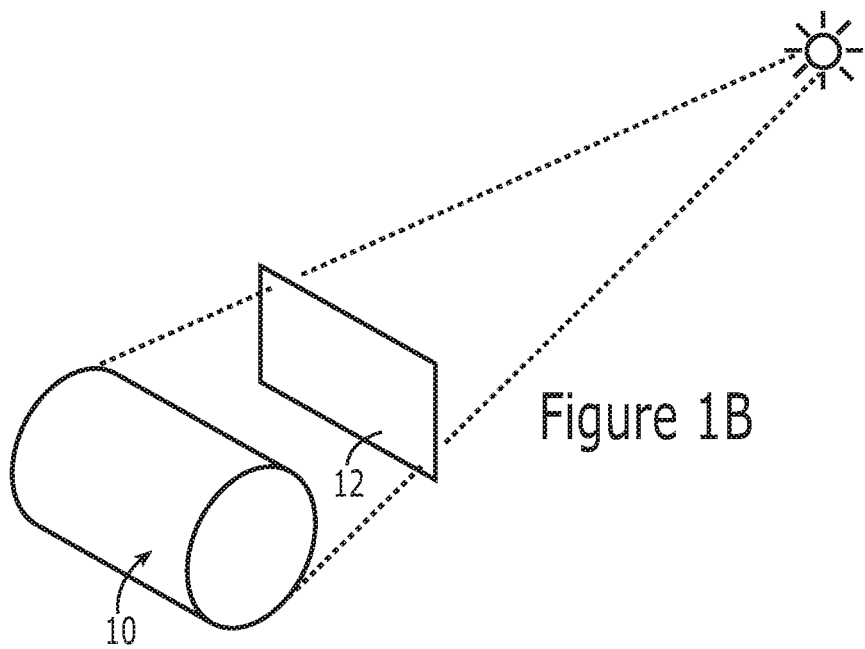
Figure 2:
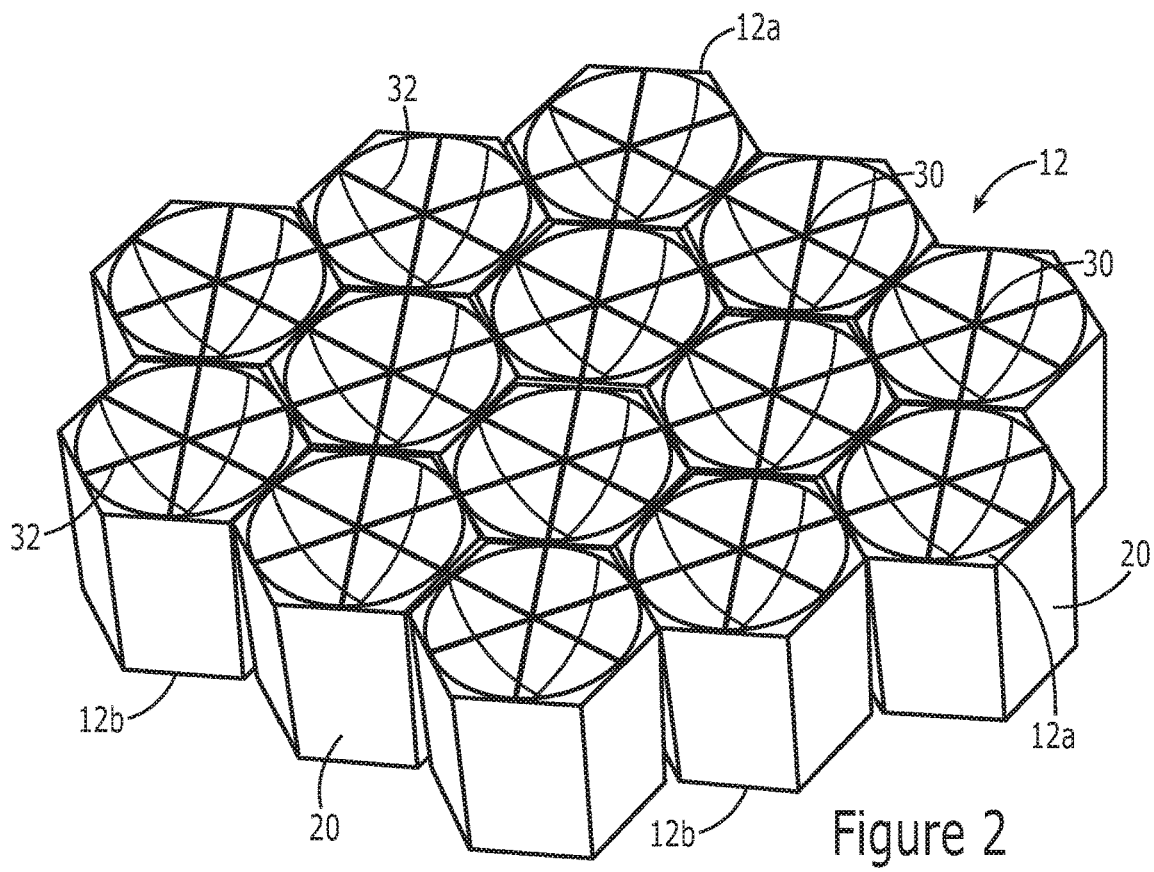
Figure 3:
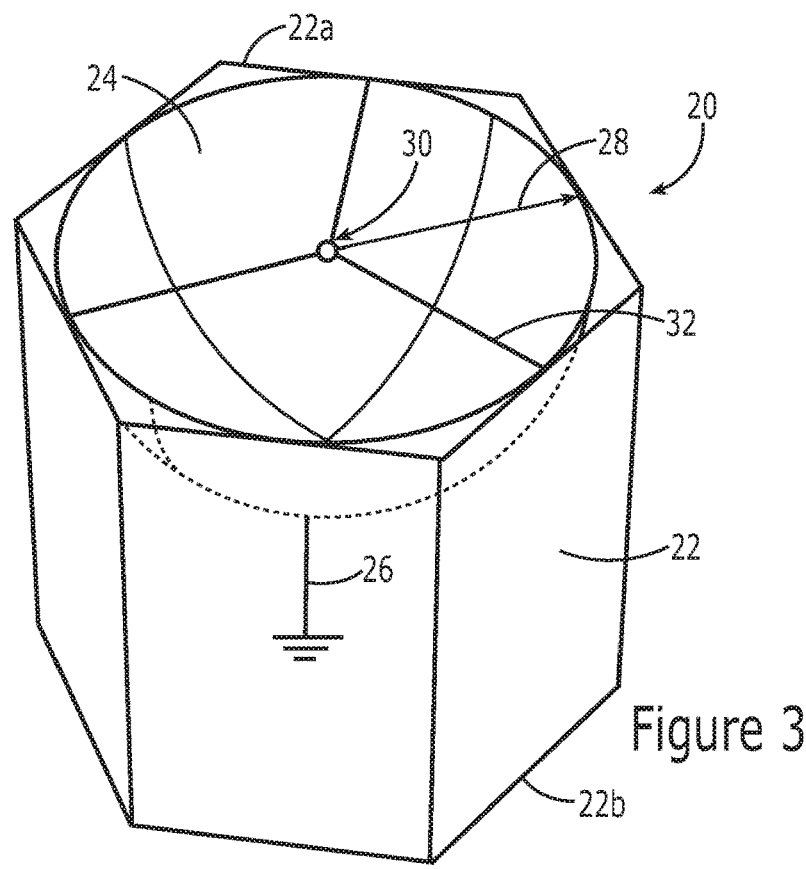
Figure 4:
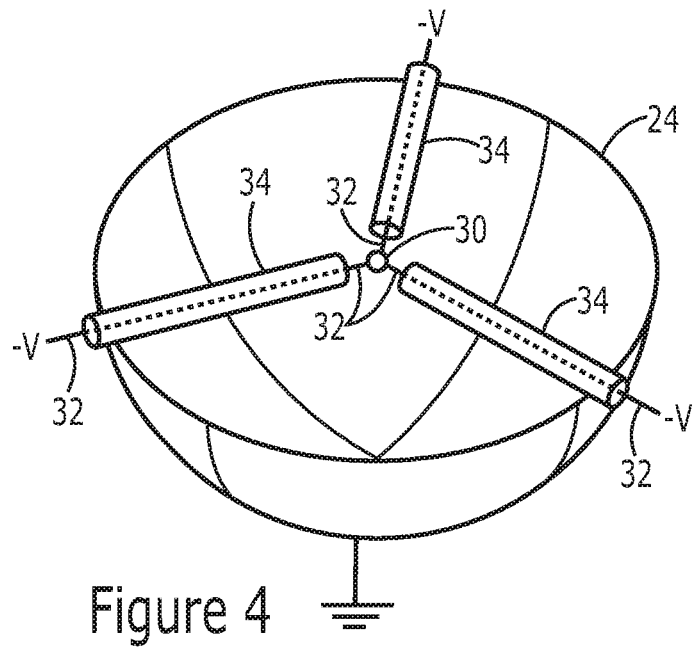
Figure 5:
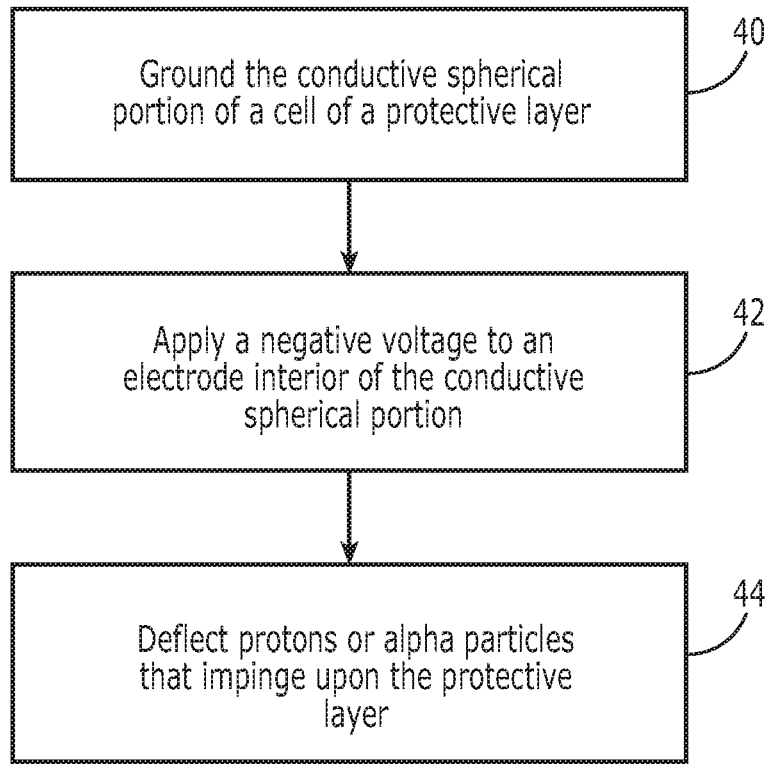
Figure 6:
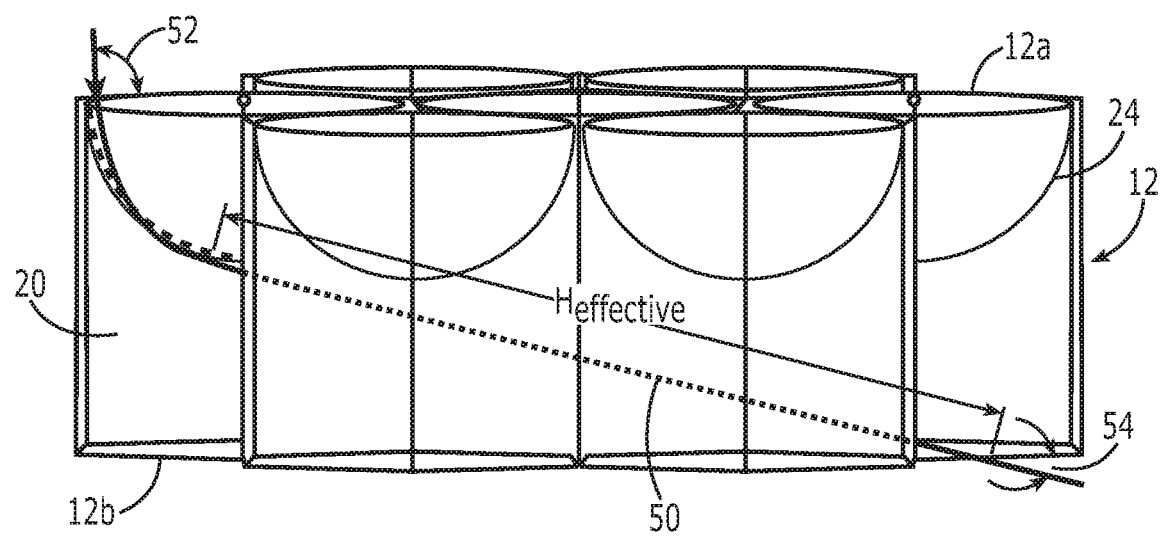

Having thus described example embodiments of the disclosure in general terms, reference will now be made to the accompanying drawings, which are not necessarily drawn to scale, and wherein:

FIG. 1A is a cross-sectional representation of a habitat for providing protection to an occupant outside of the Earth's geomagnetic shielding region in accordance with an example embodiment of the present disclosure;

FIG. 1B is a perspective view of a habitat for providing protection to an occupant outside of the Earth's geomagnetic shielding region in accordance with another example embodiment of the present disclosure;

FIG. 2 is a perspective view of an array of hexagonally shaped cells that form a portion of a protective layer that can be used in conjunction with the habitat shown in FIGS. 1A and 1B;

FIG. 3 is a perspective view of a cell that can be used with the protective layer shown in FIG. 2;

FIG. 4 is an electrical diagram of a cell for use with the protective layer shown in FIG. 2;

FIG. 5 is a flow chart illustrating the operations performed in accordance with an example embodiment of the present disclosure using the protective layer shown in FIGS. 2-4; and FIG. 6 is a side view of a portion of the protective layer shown in FIGS. 2-4 depicting the deflection of a proton or alpha particle that impinges thereupon in accordance with an example of the present disclosure.

DETAILED DESCRIPTION

Some example embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art. Like reference numerals refer to like elements throughout.

A cell, a protective layer formed of a plurality of cells and a method are disclosed for providing radiation shielding. The radiation shielding may be provided in various environments, but, in one embodiment, is provided in conjunction with excursions outside of the Earth's geomagnetic shielding region, such as during space travel and/or during habitation in space or upon other planets. The radiation shielding provided by a cell and a protective layer formed of a plurality of cells in accordance with an example embodiment reduces the radiation level to which occupants of a structure protected by a protective layer in accordance with an example embodiment are exposed, such as by reducing the radiation levels attributable to solar radiation, such as protons and alpha particles, that impinge upon the protected structure from levels that are dangerous to the occupants to safer levels, such as from 1.1 mSev to 0.86 mSev per day. As such, occupants of the protected structure may live for longer periods of time outside of the Earth's geomagnetic shielding region while being protected from the deleterious effects of the high energy protons and alpha particles, e.g., protons and alpha particles having an energy of 10 keV or more.

As a result of the construction of a cell and a protective layer formed of a plurality of cells, comparable protection is provided to that otherwise provided by a protective layer formed of bulk HDPE having a thickness of about 4 centimeters. However, the cell and the protective layer of an example embodiment provide the comparable protection while being lighter than a protective layer formed of bulk HDPE and having a thickness of about 4 centimeters. Thus, the material cost associated with the protective layer of an example embodiment may be reduced relative to a conventional bulk HDPE protective layer and, more significantly, the launch costs that are associated with the launch of a habitable structure including a protective layer of an example embodiment are correspondingly reduced as a result of the reduced weight of the protective layer.

FIG. 1A depicts an example structure 10 that may be utilized for space travel and/or or habitation in space or on another planet by one or more occupants. The structure 10 includes a protective layer 12 and a substructure 14 with the protective layer being supported by and secured to the substructure. The structure 10 depicted in FIG. 1 has a substantially cylindrical shape. However, the structure 10 may be formed in a variety of different manners so as to be differently shaped and/or sized with the structure of FIG. 1 provided by way of example, but not of limitation. While the structure 10 of FIG. 1 entirely encloses the interior volume 16, other examples of the structure may be configured to rest upon a surface, such as the ground, and, as such, need not fully enclose the interior volume as the underlying ground partly bounds the interior volume. Thus, the structure 10 of other example embodiments may include side walls and an upper surface, e.g., a roof, that include protective layers, but need not include a floor that also has a protective layer.

The protective layer 12 is supported by the substructure 14 and, in particular, by the cylindrical sidewalls of the structure 10 so as to cover the portions of the structure that are exposed to high energy protons and/or alpha particles and upon which protons and alpha particles may impinge. In the illustrated embodiment, the end walls of the structure 10 are not covered by the protective layer 12 as the orientation of the structure relative to the sun and, as such, relative to the source of the high energy photons and the alpha particles is such that a much smaller amount of high energy photons and alpha particles will impinge upon the end walls, thereby rendering the protective layer unnecessary. In an alternative embodiment, however, the protective layer 12 may fully and completely cover all portions of the structure 10, such as both the side walls and the end walls in regards to a cylindrical structure of the type shown in FIG. 1A. In an example embodiment, the protective layer 12 is secured to or attached to the substructure 14. This attachment of the protective layer 12 to the substructure 14 may be accomplished in various manners including the use of a plurality of mechanical fasteners to secure the protective layer to the substructure and/or the sure of an adhesive to adhere the protective layer to the substructure.

In an alternative embodiment depicted in FIG. 1B, the protective layer 12 is not secured to the substructure 14 as in the embodiment of FIG. 1A. Instead, the protective layer 12 may be spaced apart from, but positioned relative to the structure 10 so as to be between the structure and the source of the high energy photons and alpha particles, such as the sun in the embodiment of FIG. 1A. The protective layer 12 of this example embodiment continues to protect the structure 10 from high energy protons and/or alpha particles by intersecting or otherwise blocking the high energy protons and alpha particles prior to the impingement of the high energy protons and alpha particles upon the structure. Although not shown in FIG. 1B, the protective layer 12 of this alternative embodiment may be physically connected to the structure 10, such as by one or more supports or braces, in order to maintain the protective layer spaced apart from, but aligned with the structure relative to the source of the high energy protons and alpha particles.

The protective layer 12 includes a plurality of cells 20. A portion of a protective layer 12 of an example embodiment is shown in FIG. 2. As illustrated, the plurality of cells 20 are positioned proximate one another. For example, in one embodiment, the cells 20 are positioned in contact with one another without gaps therebetween, thereby providing a continuous protective layer. The cells 20 may be differently shaped and sized, but in an example embodiment the cells are all the same shape and size. In this regard, the cells 20 of an example embodiment may be hexagonally shaped. The cells 20 may be closely packed so as to be in contact with one another without gaps therebetween, thereby forming an array of hexagonally shaped cells positioned proximate one another, such as shown in FIG. 2.

As shown in FIG. 2 and, in more detail in FIG. 3, a first cell 20 of the plurality of cells and, in one embodiment, each cell of the plurality of cells includes a cell body 22 formed of an insulative material, such as an electronically insulative material. The cell body 22 may be formed of various insulative materials, but in one embodiment, the cell body is formed of HDPE. The cell body 22 extends between opposed first and second ends 22a, 22b. In the illustrated embodiment, the height of a cell 20, as defined between the opposed first and second ends 22a, 22b, is greater than the width of the cell, as defined perpendicular to the height-wise dimension of the cell. However, the cell 20 may have different relative dimensions in other embodiments. The plurality of cells 20 of an example embodiment are positioned relative to one another and have the same size and shape such that the protective layer 12 formed of the plurality of cells defines opposed first and second surfaces 12a, 12b, such as first and second planar surfaces that are parallel to one another, defined by opposed first and second ends 22a, 22b, respectively, of the plurality of cells, The first cell 20 also includes a conductive spherical portion 24 proximate the first end 22a of the cell body 22. In this regard, the first end 22a of the cell body 22 may define a recessed portion. The recessed portion of an example embodiment has spherical shape. While the spherically shaped recessed portion at the first end 22a of the cell body 22 may represent different portions of sphere, the recessed portion at the first end of the cell of an example embodiment has a hemispherical shape. Thus, while the conductive spherical portion 24 may similarly have shape that corresponds to any portion of a sphere, the conductive spherical portion of an example embodiment also has a hemispherical shape corresponding to the hemispherical shape of the recessed portion defined by first end 22a of the cell body 22.

The conductive spherical portion 24 is electrically conductive and, as such, may be formed of various electrically conductive materials including, for example, aluminum. In an example embodiment, the conductive spherical portion 24 is formed by a coating of a conductive material, such as aluminum or a carbon spray, upon the recessed portion of the first end 22a of the cell body 22. Thus, the coating that forms the conductive spherical portion 24 may be a continuous conductive coating that covers the entirety of the surface of the recessed portion of the first end 22a of the cell body 22. The coating may have various thicknesses, but, in one embodiment, has a thickness of about 10 microns. Alternatively, the conductive spherical portion 24 may be formed by a grid of conductive members that are supported by and extend across the recessed portion of the first end 22a of the cell body 22. In this example embodiment, the conductive members may be equally spaced and may extend in perpendicular directions extend across the recessed portion of the first end 22a of the cell body 22.

Regardless of its construction, the conductive spherical portion 24 is connected, such as by being electronically connected, to a ground potential, such as an electrical ground. The conductive spherical portion 24 may be connected to ground potential in various manners. As shown in the example embodiment of FIG. 3, the first cell 20 also includes a conductive element 26 extending from the conductive spherical portion 24 through the cell body 22 to the ground potential. In this example embodiment, the conductive element 26 is formed of an electronically conductive material, such as aluminum, and is electrically connected to the conductive spherical portion 24, thereby serving to electrically connect the conductive spherical portion to the ground potential. By extending through the cell body 22, the conductive element 26 is electrically isolated as a result of the cell body being formed of an electrically insulative material. Additionally or alternatively, the conductive spherical portion 24 may be connected to the ground potential via a differently positioned conductive element, such as a conductive element that is electrically connected to the conductive spherical portion and that extends along a side surface of the cell body 22 from the first end 22a to the opposed second end 22b and thereafter into electrical contact with the ground potential.

The conductive spherical portion 24 extends across the majority of the first end 22a of the cell body 22. The conductive spherical portion 24 may be sized such that the conductive spherical portion is coincident with the edge of the cell body 22 (defined by the intersection of the first end 22a of the cell body and the side surfaces of the cell body) at the midpoints of the sides of the cell body. In this example embodiment, the inradius 28 of the hexagonally shaped cell body 22, that is, the distance from the center of the hexagonally shaped cell 20 to a midpoint of a side of the hexagonally shaped cell, equals the radius R of the conductive spherical portion 24. Alternatively, the conductive spherical portion 24 may be slightly smaller than the first end 22a of the cell body 22 and, as a result, may not extend completely to the edge of the cell body. In this example embodiment, however, the inradius 28 of the hexagonally shaped cell 20 is greater than the radius R of the conductive spherical portion 24 by no more than a predefined percentage, such as by exceeding the radius R of the conductive spherical portion by no more than 5%, of the inradius of the hexagonally shaped cell body. Thus, the conductive spherical portion 24 of this example embodiment extends across the majority of the first end 22a of the cell body 22, but a portion of the first end of the cell body proximate the side surfaces of the cell body remains outside of the conductive spherical portion as shown in FIG. 3 and, as such, is exposed to protons and/or alpha particles impinging thereupon.

The cell 20 also includes an electrode 30 disposed interior of the conductive spherical portion 24. The electrode 30 may have various sizes and shapes, but in one embodiment, the electrode is spherical and has a radius of about 1 millimeter. In an example embodiment, the electrode 30 is aligned with the first end 22a of the cell body 22 and, as a result is also aligned with the first surface 12a of the protective layer 12. The electrode 30 of an example embodiment is also centered relative to the conductive spherical portion 24, such as along a central axis of the cell 20 extending in a height-wise direction. In an embodiment in which the conductive spherical portion 24 has a hemispherical shape, the electrode 30 of an example embodiment is positioned at the center of the hemispherically shaped conductive spherical portion. However, the electrode 30 of other embodiments is disposed at other positions interior of the conductive spherical portion 24 in that the electrode is disposed within an imaginary cylinder extending outwardly from the first end 22a of the cell body 22 so as to be coaxial with the central axis of the cell and to have a radius defined by the circular edge of the conductive spherical portion 24 at the first end of the cell body. Thus, in some embodiments, the electrode 30 may be disposed within the conductive spherical portion 24 at a location interior of the first end 22a of the cell body 22, while in other embodiments, the electrode may be positioned beyond the first end of the cell body, such as above the first end of the cell body in the orientation of the cell 20 of FIG. 3 so long as the electrode is positioned within the imaginary cylinder defined by the circular edge of the conductive spherical portion at the first end of the cell body. The electrode is formed of a conductive material, such as an electrically conductive material, e.g., aluminum.

In an example embodiment, the electrode 30 is electrically connected to a negative voltage, such as negative 70 kilovolts, negative 77 kilovolts or the like, in order to deflect protons or alpha particles that impinge upon the cell 20 as described below. In order to establish an electrical connection between the electrode 30 and a negative voltage potential, the cell 20 of an example embodiment includes one or more conductors 32 extending at least partially across conductive spherical portion 24 that are electrically connected to the electrode. In this regard, the one or more conductors 32 may extend radially from an edge of the cell body 22, such as proximate a side surface of the cell body, to the electrode 30. The cell 20 may include any number of conductors 32, such as one, two, three or more conductors, with the cell including three conductors in the illustrated embodiment of FIG. 3. In an example embodiment in which the cell 20 includes a plurality of conductors 32, the conductors are angularly spaced from one another by the same angular amount, such as 120 degrees in the example embodiment of FIG. 3.

As shown in the electrical schematic diagram of FIG. 4, each conductor 32 is formed of an electrically conductive material, such as aluminum. In an example embodiment, each conductor 32 also includes an insulated jacket 34. The insulated jacket may be formed by an electrically insulating material, such as polyvinyl chloride (PVC), nylon or other plastic materials As also illustrated in FIG. 4, each conductor 32 may be electrically connected to a voltage potential, such as a negative voltage potential, at one end and to the electrode 30 at the opposite end such that the electrode is maintained at the same voltage potential, such as the same negative voltage potential. The conductor 32 may be electrically connected to the voltage potential in various manners. In an example embodiment, however, the conductor 32 extends to the edge of the cell body 22 and then along a side surface of the cell body so as to connect to the voltage potential.

In regards to a protective layer 12 that includes a plurality of cells 20 as shown in FIG. 2, the one or more conductors 32 may extend not only across the conductive spherical portion 24 of a single cell, but also across the conductive spherical portion of one or more additional cells. Thus, a single conductor 32 may connect the voltage potential to a plurality of electrodes 30, one of which is disposed interior of the conductive spherical portion 24 of each of a plurality of cells 20. Thus, the electrodes 30 of the plurality of cells 20 may be maintained at the same voltage potential and the cells may operate in a consistent manner, thereby providing consistent deflection of protons or alpha particles incident thereupon.

In operation and as shown in FIG. 5, radiation shielding is provided by grounding the conductive spherical portion 24 that is proximate the first end 22a of the cell body 22 of a first cell 20 of the plurality of cells. See block 40 of FIG. 5. In this regard, the conductive spherical portion 24 of each of the plurality of cells 20 of the protective layer 12 may be grounded. Additionally, a negative voltage is applied to the electrode 30 disposed interior of the conductive spherical portion 24 of the first cell 20. See block 42 of FIG. 5. In this regard, the negative voltage may be applied to the electrode 30 disposed interior of the conductive spherical portion 24 of each of the plurality of cells 20 of a protective layer 12. In regards to applying the negative voltage to the electrodes 30, the electrodes of the plurality of cells 20 of the protective layer 12 may be electrically connected to the source of the negative voltage by one or more conductors 32 that extend at least partially across the conductive spherical portions 24 of the cells. As described above, the conductors 32 may extend across the conductive spherical portions 24 of a plurality of the cells 20 of the protective layer 12 so as to electrically connect the electrodes 30 of multiple cells, such as by electrically connecting the electrode of the first cell with an electrode disposed interior of conductive spherical portion of another one of the plurality of cells, proximate the first cell.

Upon impingement upon the protective layer 12 by a proton or alpha particle, the proton or alpha particle may be deflected as a result of the negative voltage at which the electrodes 30 are maintained. See block 44 of FIG. 5. In this regard, the combination of a conductive spherical portion 24 being held at the ground potential and the electrode 30 being maintained at a negative potential creates a radial force field that produces a centripetal force about the conductive spherical portion that acts upon impinging solar radiation, such as protons and/or alpha particles. In regards to deflecting protons or alpha particles that impinge upon the protective layer 12, a path 50 of the proton or alpha particle is altered such that, following deflection, the proton or alpha particle travels through the cell body 22 of two or more of the plurality of cells 20. As shown, in FIG. 6, for example, a proton or alpha particle that impinges upon the first end 22a of the cell body 22 of one cell 20, such as along the edge of the first end of the cell body that is not covered by the conductive spherical portion 24, is deflected is deflected by the negative voltage at which the electrode 30 is maintained so as to travel through the cell bodies of multiple cells prior to exiting from the protective layer 12, such as into the substructure 14 and, in turn, into the interior volume 16 within the protected structure 10 so as to irradiate the occupants therein. While traveling through the cell bodies 22, the protons or alpha particles are dampened, thereby reducing the energy level of the protons or alpha particles from a level at which exposure would dangerous to person to a lower level that is safe, at least for a period of time, for a person to be exposed.

In the example illustrated in FIG. 6, the proton or alpha particle that it impinges upon the first end 22a the cell body 22 of a first cell 20 is deflected and the path of travel 50 is altered such that the proton or alpha particle travels through multiple cells, thereby utilizing the effective surface mass instead of the normal thickness mass to dampen the impinging solar radiation. In one example embodiment, the path 50 of travel has a length $H_{effective}$ of at least 4 centimeters in length and, in some embodiments, more than 4 centimeters in length so as to provide at least the same amount and, in some embodiments, more protection than a conventional bulk HDPE protective layer that is 4 centimeters in thickness. However, the cells 20 of the protective layer 12 of an example embodiment area not as thick as a conventional bulk HDPE protective layer. For example, the height of the cells 20 of one embodiment is less than 4 centimeters and, in one embodiment is less than 2 centimeters, such as between 1.5 centimeters and 2 centimeters, thereby reducing the amount of insulative material, such as HDPE, required to form the cell body 22 and consequently reducing the weight and the corresponding launch costs associated with the protective layer 12 while still providing the same or more protection for occupants of a protected structure 10.

In an example embodiment, the protective layer 12 defines opposed first and second surfaces 12a, 12b aligned with opposed first and second ends 22a, 22b, respectively, of the plurality of cells 20. In an example embodiment, such as depicted in FIG. 6, the path of the protons or alpha particles that are incident upon the protective layer 12 is altered such that protons or alpha particles that enter the protective layer at an obtuse angle 52 relative to the first surface 12a, such as protons or alpha particles that impinge the protective layer with a perpendicular orientation to the first surface, exit the protective layer at the second surface 12b at an acute angle 54 relative to the second surface. This angular change between entry and exit angles is indicative of the deflection of the protons or alpha particles and correspondingly, the extension of the path of travel of the protons or alpha particles through the cell bodies 22 of a plurality of cells 20 in order to provide protection for the occupants of the protected structure 10 even though the protective layer 12 is thinner and lighter than the bulk HDPE protective layers that have previously been utilized.

As described above, the cell 20 and the protective layer 12 comprised of a plurality of cells provide radiation shielding, such as from protons and alpha particles having dangerously high energy levels, while being more lightweight than a conventional bulk HDPE protective layer. By being lighter, a habitable structure 10 that includes a protective layer 12 formed of a plurality of cells 20 may correspondingly be lighter than a conventional habitable structure including a bulk HDPE protective layer. Consequently, the material costs and the launch costs associated with the habitable structure 10 may be reduced without compromising the resulting radiation shielding provided by the protective layer 12 and the associated method of the present disclosure.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A protective layer for providing radiation shielding, the protective layer comprising:
   a plurality of hexagonal cells positioned proximate one another to form the protective layer,
   wherein at least a first cell of the plurality of cells comprises:
   a cell body comprising an insulative material and extending between opposed first and second hexagonal ends;
   a conductive spherical portion proximate the first end of the cell body; and
   an electrode disposed interior of the conductive spherical portion, wherein the electrode receives a negative voltage, wherein protons or alpha particles impinging upon the protective layer are deflected by the negative voltage, wherein the cell body extends a first distance between the opposed first and second hexagonal ends, and wherein the first distance is greater than a radius of the spherical portion.

2. A protective layer according to claim 1 wherein the first end of the cell body defines a recessed portion, and wherein the conductive spherical portion comprises a coating of a conductive material upon the recessed portion of the first end of the cell body.

3. A protective layer according to claim 1 wherein the plurality of cells are configured to be supported by a substructure.

4. A protective layer according to claim 1 wherein the first cell further comprises a conductive element extending from the conductive spherical portion through the cell body to a ground potential.

5. A protective layer according to claim 1 wherein the first cell further comprises one or more conductors extending at least partially across the conductive spherical portion and electrically connected to the electrode.

6. A protective layer according to claim 5 wherein a respective conductor of the one or more conductors extends in an electrically continuous manner at least partially across two or more of the plurality of cells.

7. A cell for providing radiation shielding, the cell comprising:
- a cell body comprising an insulative material and extending between opposed first and second ends;
- a conductive spherical portion proximate the first end of the cell body;
- an electrode disposed interior of the conductive spherical portion, wherein the electrode receives a negative voltage; and
- wherein in response to the first end of the cell body being exposed to radiation, a radiation particle path through the cell body is angularly changed by the conductive spherical portion through the cell body, wherein protons or alpha particles impinging upon the protective layer are deflected by the negative voltage.

8. A cell according to claim 7 wherein the first end of the cell body defines a recessed portion, and wherein the conductive spherical portion comprises a coating of a conductive material upon the recessed portion of the first end of the cell body.

9. A cell according to claim 7 further comprising one or more conductors extending at least partially across the conductive spherical portion and electrically connected to the electrode.

10. A cell according to claim 9 wherein the one or more conductors comprise an insulated jacket.

11. A cell according to claim 7 wherein the conductive spherical portion has a hemispherical shape.

12. A cell according to claim 7 wherein the cell body has a hexagonal shape, and wherein the cell body extends between opposed first and second hexagonal ends.

13. A cell according to claim 12 wherein an inradius of the hexagonally shaped cell body is greater than a radius of the conductive spherical portion by no more than 5% of the inradius of the hexagonally shaped cell body.

14. A method of providing radiation shielding with a protective layer comprising a plurality of cells positioned proximate one another, the method comprising:
- grounding a conductive spherical portion that is proximate one end of a cell body of a first cell of the plurality of cells, wherein the cell body is formed of an insulative material;
- applying a negative voltage to an electrode disposed interior of the conductive spherical portion; and
- deflecting protons or alpha particles that impinge upon the protective layer with the negative voltage.

15. A method according to claim 14 wherein applying the negative voltage to the electrode comprises electrically connecting the electrode to a source of the negative voltage with one or more conductors extending at least partially across the conductive spherical portion.

16. A method according to claim 15 wherein electrically connecting the electrode to the source of the negative voltage comprises electrically connecting the electrode of the first cell with an electrode disposed interior of a conductive spherical portion of another one of the plurality of cells, proximate the first cell.

17. A method according to claim 14 wherein deflecting protons or alpha particles that impinge upon the protective layer comprises altering a path of the protons or alpha particles such that, following deflection, the protons or alpha particles travel through the cell body of two or more of the plurality of cells.

18. A method according to claim 17 wherein the protective layer defines opposed first and second surfaces aligned with opposed first and second ends, respectively, of the plurality of cells, and wherein altering the path of the protons or alpha particles comprises altering the path of protons or alpha particles that enter the protective layer at an obtuse angle relative to the first surface such that the protons or alpha particles exit the protective layer at an acute angle relative to the second surface.

19. A protective layer according to claim 1, wherein the first end of the cell body is exposed to radiation, and wherein a radiation particle path through the protective layer is angularly changed by the conductive spherical portion through the protective layer.

* * * * *